US008871329B2

(12) United States Patent
Yoshida et al.

(10) Patent No.: US 8,871,329 B2
(45) Date of Patent: Oct. 28, 2014

(54) TOOTHED POWER TRANSMISSION BELT WITH CLOTH COMPONENT THEREON

(75) Inventors: Masakuni Yoshida, Hyogo (JP); Yasuyuki Izu, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 1986 days.

(21) Appl. No.: 11/700,830

(22) Filed: Jan. 31, 2007

(65) Prior Publication Data

US 2007/0178792 A1 Aug. 2, 2007

(30) Foreign Application Priority Data

Jan. 31, 2006 (JP) .................................. 2006-21619
Oct. 3, 2006 (JP) .................................. 2006-271458

(51) Int. Cl.
*B32B 3/30* (2006.01)
*F16G 1/28* (2006.01)

(52) U.S. Cl.
CPC ........................................ *F16G 1/28* (2013.01)
USPC ............................ 428/167; 428/171; 428/172

(58) Field of Classification Search
USPC .......... 442/293, 213, 205–207; 428/167, 171, 428/172
See application file for complete search history.

(56) References Cited

U.S. PATENT DOCUMENTS

| | | | | |
|---|---|---|---|---|
| 4,265,627 A * | 5/1981 | Imamura | ....................... | 474/267 |
| 4,302,197 A * | 11/1981 | Kimura et al. | ................. | 474/205 |
| 4,515,853 A * | 5/1985 | Borel | ............................ | 442/205 |
| 5,170,280 A * | 12/1992 | Sato | ............................... | 359/232 |
| 5,971,879 A * | 10/1999 | Westhoff | ....................... | 474/260 |
| 7,056,249 B1 * | 6/2006 | Osako et al. | ................... | 474/260 |
| 2002/0179228 A1 * | 12/2002 | Gibson et al. | ................. | 156/139 |
| 2006/0116042 A1 * | 6/2006 | Nagura et al. | ................. | 442/205 |

FOREIGN PATENT DOCUMENTS

| | | |
|---|---|---|
| EP | 0619442 A1 | 10/1994 |
| JP | 2003-3221470 A | 8/2003 |
| JP | A-108574 | 4/2004 |
| JP | A-108576 | 4/2004 |
| JP | 2005-240862 A | 9/2005 |
| JP | A-90338 | 4/2006 |

OTHER PUBLICATIONS

Partial machine translation JP 2004-108576, Apr. 2004.*
Machine translation JP 2004-108576, Apr. 2004.*

* cited by examiner

*Primary Examiner* — Elizabeth Cole
(74) *Attorney, Agent, or Firm* — Wood, Phillips, Katz, Clark & Mortimer (57) ABSTRACT

A power transmission belt having a body with a length, an inside, and an outside. The body has a plurality of teeth formed on the inside of the body and spaced along the length of the body. The body has a first surface at the inside of the body defined at least in part by the teeth. A cloth component has a first side attached to the first surface and a second side exposed to engage a cooperating pulley. The cloth component has first fibers at the first side of the cloth component with a first performance characteristic and second fibers at the second side of the cloth component with a second performance characteristic. The first side of the cloth component has different properties than the second side of the cloth component by reason of the presence of the first and second fibers.

38 Claims, 4 Drawing Sheets

Fig. 10

TOOTHED POWER TRANSMISSION BELT WITH CLOTH COMPONENT THEREON

BACKGROUND OF THE INVENTION

1. Field of the Invention

This invention relates to power transmission belts and, more particularly, to a power transmission belt having a cloth component applied over a surface on which teeth are formed.

2. Background Art

Toothed power transmission belts with a cloth component thereon are used in a number of different environments under conditions that are often relatively severe. For example, toothed belts are used to drive components on automobile engines, such as a cam shaft, an injection pump, an oil pump, a water pump, and the like. Since automobile engine compartments are increasingly becoming more compact, these belts are required to operate in environments at elevated temperatures generated during engine operation. The environmental conditions and loads encountered dictate the need for toothed belts with higher durability.

These toothed belts are also used on rear-wheel drives of large, high-powered motorcycles, increasingly in place of chain and sprocket drives that have been used in the past.

These toothed belts are used also on industrial machinery as, for example, on injection molding equipment. In this environment, the belts may be subjected to high loads and may be required to operate for long periods without replacement.

Toothed belts are used in other environments in which they are commonly subjected to severe loading and environmental conditions that tend to lead to premature failure.

To avoid premature failure, improvements have been made on toothed belts in a number of different areas. The materials of load carrying members that extend lengthwise of the belts have been changed for improved durability and longevity. Thinner load carrying members have also been developed. Further, treating agents for load carrying cords have been devised to improve the heat resistance thereof. These improvements have been focused on avoiding failure due to flexing fatigue of the load carrying members as well as inadequate heat resistance of the rubber in which they are embedded. Additionally, hydrogenated nitrile rubber has been used to improve heat resistance, thereby decreasing the likelihood of premature failure.

Toothed belts used on engines in which the belts are highly loaded, and in driving industrial machinery, are often abraded to a significant degree at the base portion of the teeth. It is also common for the teeth to chip as a result of abrasion at the base portion of the teeth.

Additionally, under high loads, pulley shafts tend to bend, whereby the travelling path defined by the pulley tends to skew. When this occurs, the belt does not properly seat in the pulleys and runs at an angle with respect thereto, as a result of which there is a tendency for there to be abnormal abrasion at the belt side surfaces that contact the cooperating pulley flanges. Cutting and chipping of the teeth at the side surfaces may occur with this operating condition.

In a high load application, the belts also tend to stretch to an extent that an autotensioner does not effectively make compensation. As a result, the belt may not be properly tensioned whereupon operation of associated mechanisms, such as an engine or accessories thereon, may not operate consistently or normally.

To counter abrasion of the belt side surfaces, and damaging elongation of a belt, it is known to use a fluorine resin that tends to reduce the coefficient of friction of the associated surface. It is also known to apply a layered graphite, or the like, to a cloth composition on the tooth surfaces that mesh with a cooperating pulley. Generally, it is believed that these steps do not account for adequate improvement, particularly with respect to load carrying member performance.

In JP-B-58-334323, a cloth component for a toothed belt is disclosed with separate yarns. In one of the yarns, 6-nylon or 6, 6-nylon fiber material is used for purposes of good adhesion with rubber. In the other yarn, fluorine fibers or carbon fibers are used. The dimensional accuracy of the toothed portion of the belt may not be maintainable merely using fluorine fibers or carbon fibers in the yarns. A product with this cloth component may not be useable in the automotive environment in which a high, maintained level of dimensional accuracy of the tooth region is required.

SUMMARY OF THE INVENTION

In one form, a power transmission belt has a body with a length, an inside, an outside, and laterally spaced and oppositely facing side surfaces. The body has a plurality of teeth formed on one of the inside and outside of the body and spaced along the length of the body. The body has a first surface at the one of the inside and outside of the body defined at least in part by the teeth. A cloth component has oppositely facing first and second sides with the first side attached to the first surface and the second side exposed to engage a pulley cooperating with the power transmission belt. The cloth component consists of first fibers at the first side of the cloth component with a first performance characteristic and second fibers at the second side of the cloth component with a second performance characteristic that is different than the first performance characteristic. The first side of the cloth component has different properties than the second side of the cloth component by reason of the presence of the first and second fibers.

In one form, the body consists of rubber that defines at least a part of the first surface and at least one load carrying member is embedded in the rubber and extends lengthwise of the body adjacent the other of the inside and outside of the body.

In one form, the body consists of rubber that defines at least a part of the first surface. The first fibers have a composition that adheres strongly to the rubber at the first surface. The second fibers have a composition with a low coefficient of friction.

In one form, the first fibers have a composition that adheres more strongly to the rubber than the composition of the second fibers and the second fibers have a composition with a lower coefficient of friction than the coefficient of friction of the first fibers.

In one form, the second fibers have good abrasion resistance characteristics.

In one form, the cloth component has a double cloth construction.

In one form, the second fibers are fluorine fibers.

In one form, the cloth component consists of warp yarns having nylon fibers and weft yarns having fluorine fibers, nylon fibers, and polyurethane elastic yarns.

In one form, the cloth component has a double cloth construction. The first fibers have a composition that adheres more strongly to the rubber than the composition of the second fibers and the second fibers have a composition with a lower coefficient of friction than the coefficient of friction of the first fibers.

In one form, the cloth component consists of warp yarns having fluorine fibers, nylon fibers, and polyurethane elastic yarns and weft yarns having nylon fibers.

In one form, the weft yarns consist of a plurality of first weft yarns at the first side of the cloth component and a plurality of second weft yarns at the second side of the cloth component and at least the plurality of second weft yarns includes fluorine fibers.

In one form, the warp yarns consist of a plurality of first warp yarns at the first side of the cloth component and a plurality of second warp yarns at the second side of the cloth component and at least the second warp yarns include fluorine fibers.

In one form, from 20-100% of the warp yarns are woven by being intertwined with the second weft yarns.

In one form, from 20-100% of the weft yarns are woven by being intertwined with the second warp yarns.

In one form, the second weft yarns consist of urethane elastic yarns that have core parts with exposed circumferences and fluorine fibers are applied on the exposed circumferences of the core parts.

In one form, the second warp yarns consist of urethane elastic yarns that have core parts with exposed circumferences and fluorine fibers are applied on the exposed circumferences of the core parts.

In one form, the first weft yarns consist of urethane elastic yarns that have core parts with exposed circumferences and nylon fibers are applied on the exposed circumferences of the core parts.

In one form, the first warp yarns consist of urethane elastic yarns that have core parts with exposed circumferences and nylon fibers are applied on the circumference of the core parts.

In one form, the second side of the cloth component has an area and the fluorine fibers in the cloth component are exposed on the second side over from 30-100% of the area of the second side.

In one form, the second fibers consist of fluorine fibers having a coefficient of friction less than the coefficient of friction of the first fibers, and the first side of the cloth component consists of five sateen weaves with fibers that adhere more strongly to the rubber than fibers on the second side of the cloth component. The cloth component has warp yarns made from nylon fibers and weft yarns made from fluorine fibers, nylon fibers, and polyurethane elastic yarns.

In one form, the fluorine fibers consist of at least one of a polytetrafluoroethylene, a polytrifluoroethylene, a tetrafluoroethylene-hexafluoropropylene copolymer, a tetrafluoroethylene-perfluoroalkoxyethylene copolymer, and a tetrafluoroethylene-ethylene copolymer.

In one form, the fluorine fibers are polytetrafluoroethylene fibers with a polytetrafluoroethylene content in the polytetrafluoroethylene fibers of from 90-100 parts by mass per 100 parts by mass of the polytetrafluoroethylene fiber.

In one form, the second side of the cloth layer has an area and the fluorine fibers in the cloth layer are exposed on the second side over from 50-100% of the area of the second side of the cloth layer.

In one form, a resorcin-formalin-latex treatment is applied to the cloth component.

In one form, the resorcin-formalin-latex consists of fluorine resin in an amount of 1-80 parts by mass per 100 parts by mass of the latex.

In one form, the cloth component is treated with a rubber paste containing graphite in an amount of from 10-200 parts by mass per 100 parts by mass of the rubber.

In one form, the rubber defines at least part of the teeth and is a composition obtained by blending an unsaturated carboxylic acid metal salt and silica with a hydrogenated nitrile rubber, blending short fibers therewith to produce a mixture, and crosslinking the resulting mixture with an organic peroxide.

In one form, the rubber defines at least a part of the teeth and is a composition obtained by adding an unsaturated carboxylic acid metal salt to a hydrogenated nitrile rubber in an amount of from 15-40 parts by mass to a total polymer mass, blending silica in an amount of from 10-60 parts by mass to the total polymer mass, and blending short fibers in an amount of from 1-20 parts by mass to the total polymer mass.

In one form, the blended amount of silica is from 30-60 parts by mass.

In one form, at least one triallylisocyanurate, triallylcyanurate, trimethylolpropane trimethacrylate and ethylene glycol dimethacrylate is added to the rubber as a co-crosslinking agent in an amount of from 5 to 20 parts by mass. An organic peroxide is added to the rubber in an amount of from 0.2 to 10 parts by mass.

In one form, the other of the inside and outside of the body has a hardness of from 80-98 degree as measured with a JIS A type hardness meter.

DETAILED DESCRIPTION OF THE INVENTION

Figure 1:
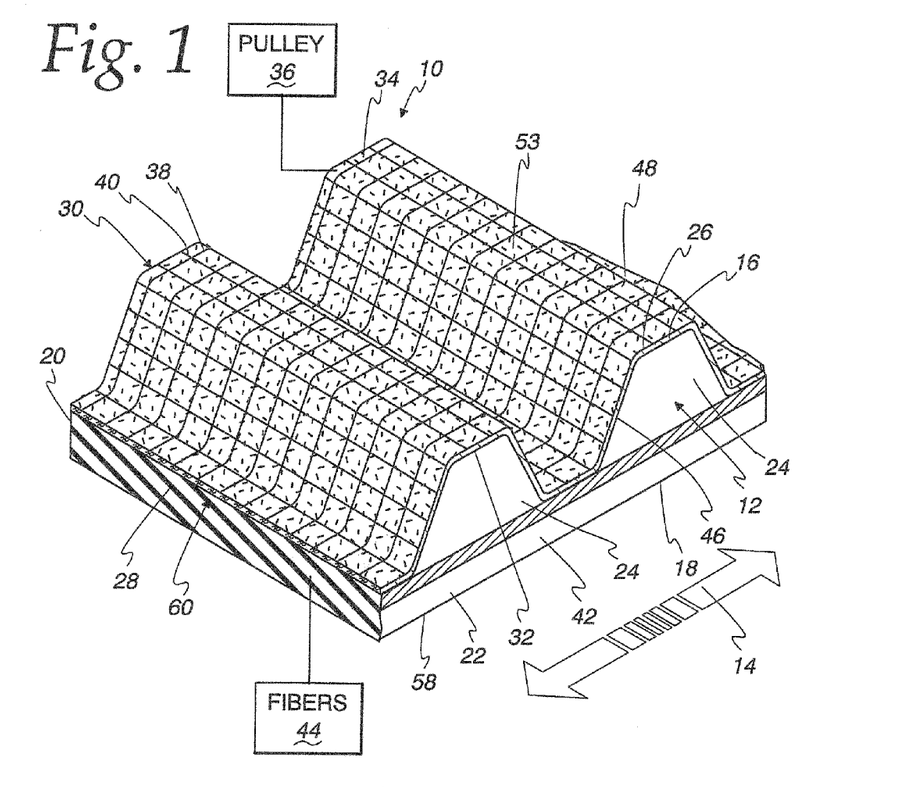
FIG. 1 is a fragmentary, perspective view of one form of power transmission belt, according to the present invention, including a body with a cloth component.

A toothed belt, according to the present invention, is shown at 10 in FIG. 1. The belt 10 has a body 12 with an endless length extending in the direction of the double-headed arrow 14. The body 12 has an inside 16 and an outside 18. The designations "inside" and "outside" are arbitrary as either side could be viewed as either "inside" or "outside". The body 12 further has laterally spaced and oppositely facing side surfaces 20, 22. The body 12 has a plurality of teeth 24 formed on the inside of the body 12 that are spaced at regular intervals along the length thereof. The body has a first surface 26 at the inside thereof defined in part by the teeth 24. The body 12 is made from rubber in which load carrying members/cords 28 are embedded. The load carrying members/cords 28 extend lengthwise of the body 12 and define a neutral axis.

A cloth component 30 is applied to the body 12 and has oppositely facing first and second sides 32, 34, respectively.

The first side 32 of the cloth component 30 is attached to the first surface 26 on the body 12. The second side 34 of the cloth component 30 is exposed to engage a cooperating pulley 36 having a complementary configuration to that of the inside 16 of the body 12, as covered by the cloth component 30.

The cloth component 30 consists of a fabric substrate material produced by weaving weft yarns 38, extending lengthwise of the belt body 12, and warp yarns 40, extending laterally/widthwise of the belt body 12.

The belt body 12 may be made from the same composition or by combining layers having different compositions. In one form, a back portion 42 of the body 12, outside of the load carrying members/cords 28, consists of a blend of an unsaturated carboxylic acid metal salt with a hydrogenated nitrile rubber. The degree of hydrogenation of the hydrogenated nitrile rubber is at least 90% or more, for purposes of heat resistance. More preferably, the degree of hydrogenation is 92-98%.

The blending of the unsaturated carboxylic acid metal salt with the hydrogenated nitrile rubber increases the tensile modulus and hardness, potentially avoiding detrimental compression deformation of the teeth 24. To achieve the desired tensile modulus and elongation at failure, and further to achieve the desired tearing strength and hardness, the unsaturated carboxylic acid metal salt is added to the hydrogenated nitrile rubber in an amount of 15-40 parts by mass to 100 parts by mass of the entire polymer.

When the amount of the unsaturated carboxylic acid metal salt is less than 15 parts by mass, the rubber hardness may not reach the desired level. On the other hand, when the amount exceeds 40 parts by mass, the rubber may be too hard, as a result of which the belt 10 is undesirably rigid and flexing fatigue resistance may be inadequate. This may result in a detrimentally shortened belt life.

The unsaturated carboxylic acid metal salt may be an ion-bonded material of an unsaturated carboxylic acid having a carboxylic group and a metal. The unsaturated carboxylic acid is preferably a dicarboxylic acid such as acrylic acid or methacrylic acid Suitable metals are berylium, magnesium, calcium, strontium, barium, titanium, chromium, molybdenum, manganese, iron, cobalt, nickel, copper, silver, zinc, cadmium, aluminum, tin, lead and antimony.

Silica is blended with a mixture of the hydrogenated nitrile rubber and unsaturated carboxylic acid metal salt The amount of silica is preferably from 10 to 40 parts by mass per 100 parts by mass of the entire polymer.

When the amount of silica is less than 10 parts by mass, the desired effect from the silica may not be achieved. On the other hand, when the amount of silica is larger than 40 parts by mass, the Mooney viscosity of the rubber increases In that case, when the belt is molded, the tooth shape may not be accurately produced and molding defects may be more prevalent.

The blend further is a crosslinked product of the rubber having from 5-20 parts by mass of tryallyl isocyanurate (TAIC) as a co-crosslinking agent and from 0.2 to 10 parts by mass of an organic peroxide blended therewith By blending a specific co-crosslinking agent with a rubber containing an unsaturated carboxylic acid metal salt, the viscosity may not increase during uncrosslinking, facilitating processing such as rolling or molding. After crosslinking, good hardness and strength may be achieved.

The ratio of the hydrogenated nitrile rubber and the unsaturated carboxylic acid metal salt is preferably from 98:2 to 55:45. If the proportion of the hydrogenated nitrile rubber is greater than 98, abrasion resistance may be inadequate. When the proportion is smaller than 55, while abrasion resistance may be good, the flexing properties of the belt deteriorate It is also possible to form a matrix rubber by blending the hydrogenated nitrile rubber containing the unsaturated carboxylic acid metal salt in order to adjust the ratio.

The organic peroxide is used as a crosslinking agent. Examples thereof include di-t-butyl peroxide, dicumyl peroxide, t-butylcumyl peroxide, 1,1-t-butyl-peroxy-3,3,5-trimethyl cyclohexane, 2,5-dimethyl-2,5-di (t-butylperoxy)hexane-3, bis(t-butylperoxy-diisopropyl)benzene, 2,5-dimethyl-2,5-di(benzoylproxy)hexane, t-butylperoxybenzoate and t-butylperoxy-2-ethylhexyl carbonate.

The blending amount is preferably from 0.2 to 10 parts by mass per 100 parts by mass of the matrix rubber.

When the blending amount is less than 0.2 parts by mass, crosslinking may not be adequately carried out When the blending amount exceeds 10 parts by mass, elasticity may be detrimentally reduced.

Silica is blended in an amount from 10 to 60 parts by mass, and more preferably from 30 to 60 parts by mass, per 100 parts by mass of the matrix rubber.

When the amount is less than 10 parts by mass, the adhesion forces between the rubber and load carrying members/cords 28 may be inadequate This may lead to a condition where the load carrying members/cords 28 peel and thus protrude.

When the amount exceeds 60 parts by mass, viscosity under unvulcanization increases and the belt cannot be properly formed 30 parts by mass or more is preferable to achieve a high belt hardness.

To obtain additional strength, short fibers 44 may be added in an amount of 1-20 parts by mass per 100 parts by mass of the entire polymer.

Suitable examples of the co-crosslinking agent include: TAIC, TAC, 1,2-polybutadiene, metal salts of unsaturated caboxylic acid, oximes, guanidine, trimethylolpropane, trimethacrylate, ethylene glycol dimethacrylate and N,N'-m-phenylene bismaleimide. Preferably, at least one of TAIC and TAC is used. By using TAIC or TAC, the hardness of the rubber after crosslinking can be increased as compared with rubbers using other crosslinking agents.

Further, the viscosity of an uncrosslinked rubber does not rise significantly and, as a result, workability and moldability do not significantly deteriorate.

The blending amount of the co-crosslinking agents is preferably in the range of 5-20 parts by mass.

When the amount is less than 5 parts by mass, the hardness of the belt may not be adequate When the amount exceeds 20 parts by mass, the degree of crosslinking may be excessive, as a result of which tear resistance force is detrimentally decreased.

In addition to the above, depending upon the particular application for the belt, it may be desirable to blend fillers for improving abrasion resistance, such as: carbon black, calcium carbonate and talc, that are generally blended with a rubber; and additives such as crosslinking assistants, crosslinking accelerators, plasticizers, stabilizers, processing assistants, antioxidants and coloring agents Methods of mixing those blending agents include, but are not limited to, conventional means such as kneading using a Banbury mixer, or a kneader.

The cloth component 30 is made so that first fibers 46, at the first side 32 of the cloth component 30, have a first performance characteristic and second fibers 48, at the second side 34 of the cloth component 30, have a second performance characteristic that is different than the first performance characteristic The nature of the first and second fibers 46, 48, and the manner in which they are incorporated into the cloth layer, as explained below, cause the cloth component 30 to have different properties at the opposite sides 32, 34 thereof.

In one form, the second fibers 48 on the cloth component side 34 that cooperates with the pulley 36 have a coefficient of friction lower than that of the first fibers 36 on the first side 32 of the cloth component 30 that is adhered to the belt body surface 26. The fibers 46 on the first side 32 of the cloth component 30 are of a type that adheres more aggressively to the belt body rubber than do the fibers 48.

Figure 2:
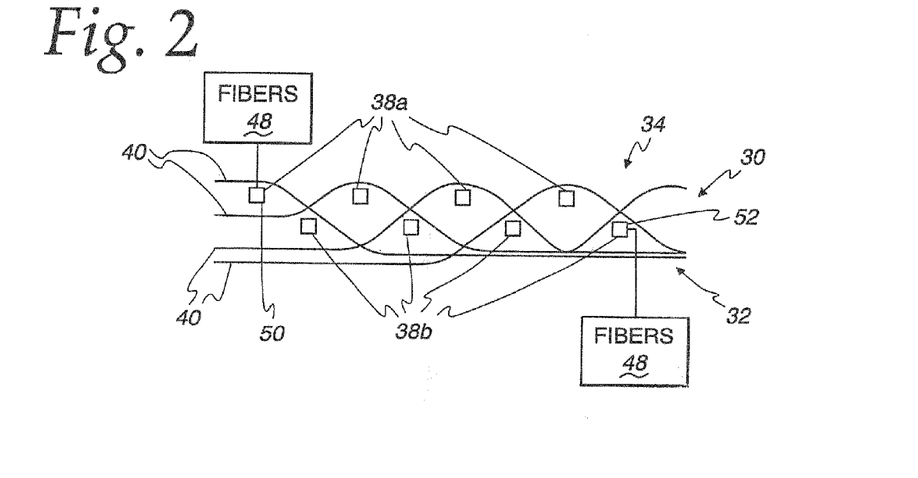
FIG. 2 is a schematic, cross-sectional view of the cloth component in FIG. 1 taken in a plane through the length of weft yarns.

More specifically, as seen in FIG. 2, the second fibers 48 preferably consist of at least fluorine fibers. These fibers 48 are preferably exposed on the first side 32 of the cloth component 30 on over from 0-20% of the area of the first side 32

Figure 3:
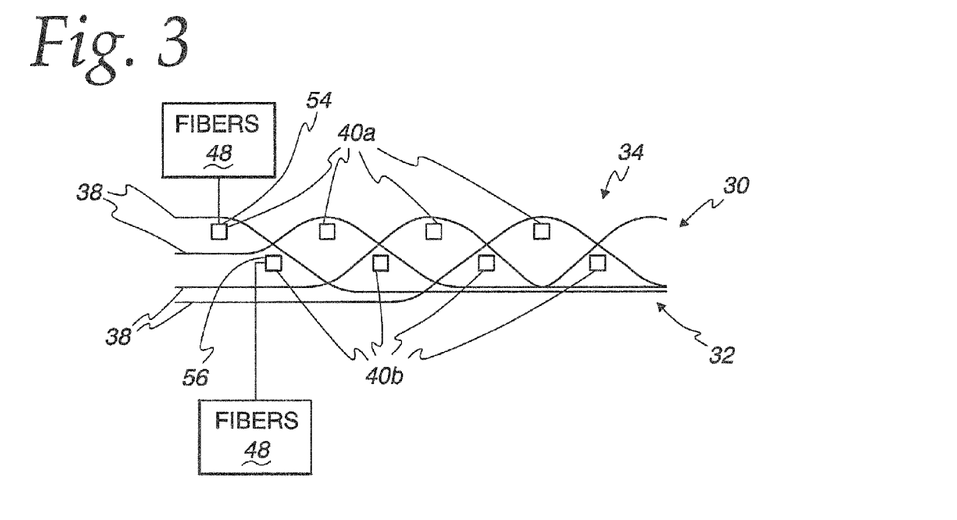
FIG. 3 is a few as in FIG. 2 taken from a perspective in a plane through the length of warp yarns.

The cloth component 30 is preferably a double cloth fabric. In one form, the warp yarns 40 include nylon fibers, with the weft yarns 38 including fluorine fibers, nylon fibers and polyurethane elastic yarns. As seen in FIG. 3, woven weft yarns 38 extend continuously between the first second sides 32, 34 of the cloth component 30. As seen in FIG. 2, woven warp yarns 40 likewise extend continuously between the first and second sides 32, 34 of the cloth component 30. The weft yarns 38 preferably include a plurality of first weft yarns 38a exposed at the second side 34 of the cloth component 30 and a plurality of second weft yarns 38b at the first side 32 of the cloth component 30. At least the plurality of first weft yarns 38a consists of a yarn with fluorine fibers.

It is preferred that from 20-100% of the warp yarns 40 be interwoven with the plurality of first weft yarns 38a. The first weft yarn 38a is preferably a yarn made from a urethane elastic yarn with a core part 50 having fluorine and/or nylon fibers 48 on the circumference thereof. The yarn having the fluorine fibers on the circumference thereof is preferably present in an amount of 40-100% of the plurality of first weft yarns 38a.

The plurality of second weft yarns 38b preferably consists of yarns having a core part 52 with nylon fibers 48 on the circumference thereof. The fluorine fibers 48 in the cloth component 30 preferably are exposed at the surface 53 of the second side 34 of the cloth component 30 on over 30-100% of the total area of the surface 53. In one exemplary embodiment having the construction shown in FIG. 2, the fluorine fibers 48 are exposed over approximately 75% of the area of the surface 53.

As seen in FIG. 3, the cloth component 30 may have weft yarns 38 consisting of nylon fiber, with the warp yarns 40 consisting of fluorine fibers, nylon fibers, and polyurethane elastic yarns. The warp yarns 40 consist of a plurality of first warp yarns 40a at the surface 53 on the second side 34 of the cloth component 30 and a plurality of second warp yarns 40b at the first side 32 of the cloth component 30. At least the plurality of first warp yarns 40a is made of yarns that include fluorine fibers.

It is preferred that from 40-100% of the number of weft yarns 38 be woven by being intertwined with the first warp yarns 40a. The first warp yarns 40a are preferably yarns consisting of a core part 54 having at least one of fluorine fibers or nylon fibers 48 on the circumference thereof. The yarns having the fluorine fiber on the circumference thereof are preferably present in an amount of 40-100% of the plurality of first warp yarns 40a.

The plurality of second warp yarns 40b preferably has a urethane elastic yarn core part 56, with nylon fibers 48 on the circumference thereof.

The fluorine fibers 48 in the cloth component 30 preferably are exposed on the surface 53 of the second side 34 of the cloth component 30 over from 30-100% of the total area thereof. The proportion of fluorine fibers, as noted previously, may be exposed, for example, over 75% of the area of the surface 53

In another embodiment, the cloth component 30 is preferably a double cloth fabric. The second side 34 is made with fibers having a low coefficient of friction and good abrasion resistance. The fibers 46 are of a composition to strongly adhere to the rubber in the body 12. The coefficient of friction at the surface 53 on the second side 34 is preferably less than 2.

If the dynamic friction coefficient is greater than 0.2, thrust forces become relatively large and the belt 10 may move and remain in front of an axis. This may give rise to a problem where the side surfaces 20, 22 become damaged, eventually resulting in belt breakage.

The cloth component 30 may be woven by a five sateen weave process. With this construction, the fibers 48 on the surface on the second side 34 have a coefficient of friction less than the fibers 46 on the first side 32 As in the prior embodiments, the fibers 46 on the first side 32 have a composition that adheres more positively to the rubber in the body 12 than do the fibers 48 on the second side 34. The fibers 48 with the low friction coefficient preferably are present on the first side 32 over 0-20% of the area thereof.

With the five sateen weave process, it is preferable that the warp yarns 40 include nylon fibers, with the weft yarns 38 including fluorine fibers, nylon fibers, and polyurethane elastic yarns.

In one form, the weave textile weave of the double cloth is made up of warp yarns consisting of 6,6-nylon fiber, and weft yarns consisting of urethane elastic yarns and polytetrafluoroethylene fibers. The weave textile weave is 3/1 twilled weave, or a weave wherein the second side 34 is a 1/3 twilled weave, with the first side 32 a 2/2 twilled weave.

Figures 5, 6, 7:
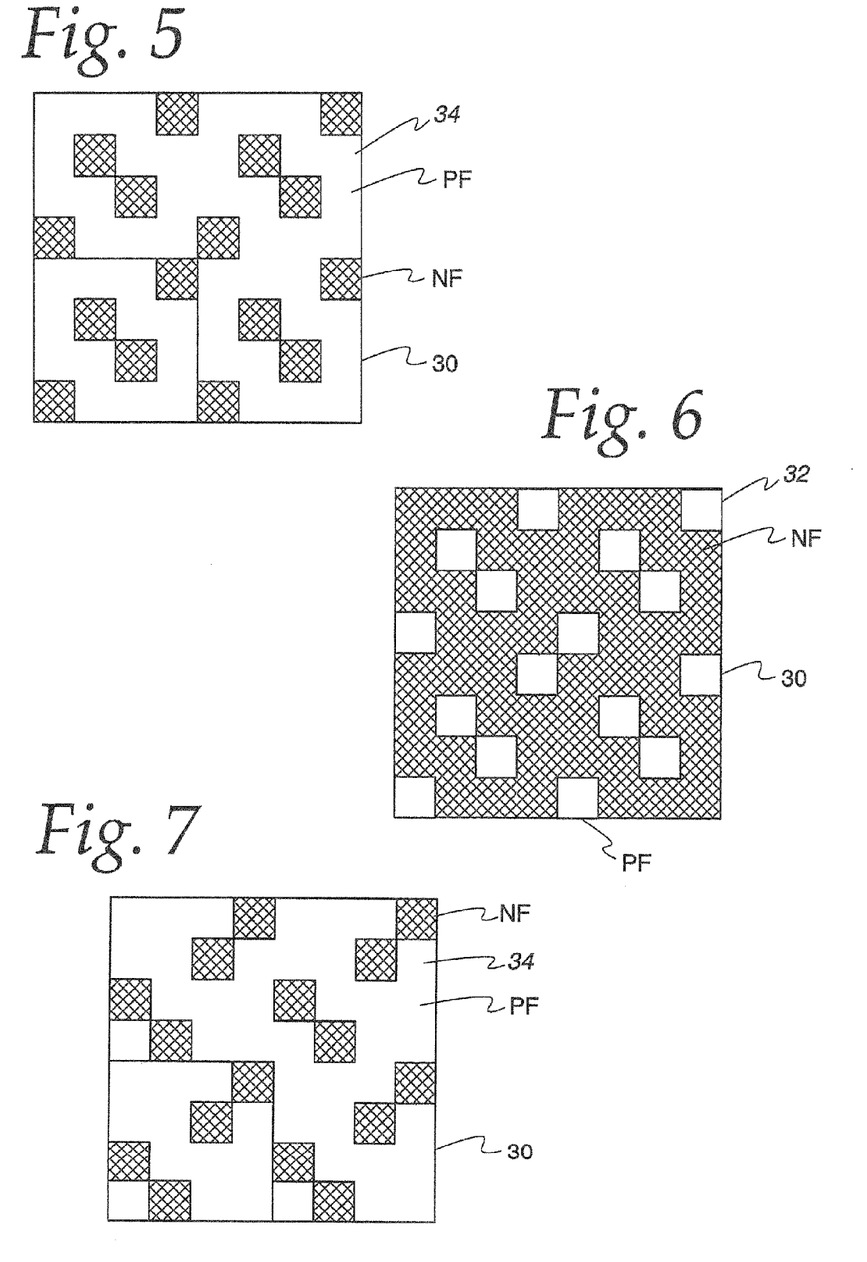
FIG. 5 is a schematic representation of a section of a side of the cloth component that engages a cooperating pulley wherein the weave textile weave is 3/1 twilled weave.
FIG. 6 is a view as in FIG. 5 of the opposite side of the cloth component wherein the weave textile weave is 3/1 twilled weave.
FIG. 7 is a view as in FIG. 5 wherein the weave textile weave is a double cloth.

The exposure of the polytetrafluoroethylene fibers and nylon fibers at the opposite sides of the cloth component 30, resulting with a 3/1 twilled weave process is shown in FIGS. 5 and 6 wherein the former is identified as PF and the latter as NF. FIG. 5 depicts the second side 34, with FIG. 6 depicting the first side 32.

Figures 8, 9, 10:
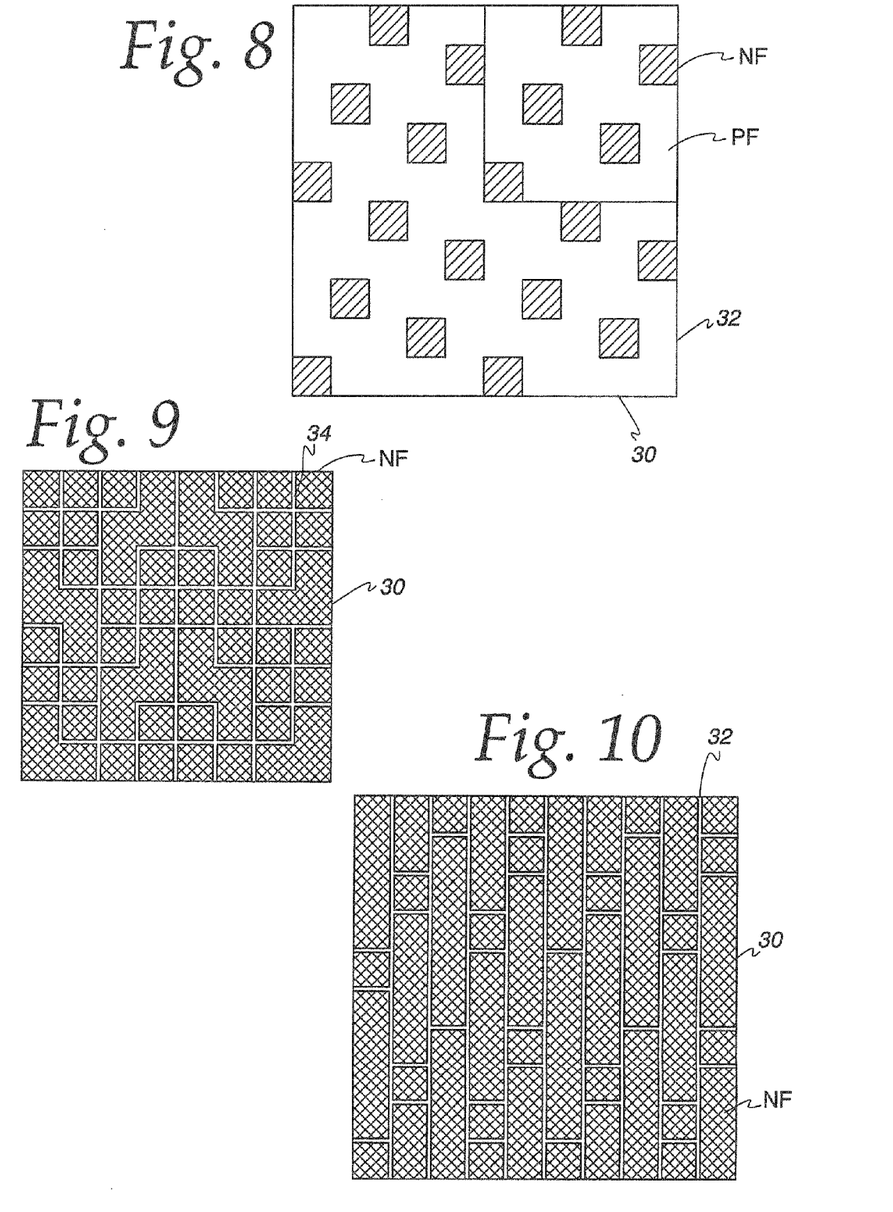
FIG. 8 is a view as in FIG. 6 wherein the weave textile weave is a double cloth.
FIG. 9 is a view as in FIG. 5 wherein the weave textile weave is 5 sateen weave.
FIG. 10 is a view as in FIG. 6 wherein the weave textile weave is 5 sateen weave.

In FIGS. 7 and 8, views corresponding respectively to FIGS. 5 and 6 are shown for the cloth component 30 with a weave textile weave that is a horizontal double cloth, with the fibers similarly identified as "NF" and "PF".

In FIGS. 9 and 10 views corresponding respectively to FIGS. 5 and 6 are shown for the cloth component 30 with a weave textile weave that is a five sateen weave. The exposed nylon fibers are likewise identified as "NF".

The weave textile weave of the five sateen weaves may be any single cloth of 3/1 twilled weave or five sateen weave.

In the case of the five sateen weave, in one form, the warp yarns are made of 6,6-nylon fiber, with the weft yarns made of urethane elastic yarns and polytetrafluoroethylene fibers.

With the cloth component 30 in the form of a single cloth or a double cloth, preferably the fibers exposed at the surface 53 on the second side 34 are predominantly fluorine fibers. The fluorine fibers may be one or a combination of polytetrafluoroethylene, polytrifluoroethylene and tetrafluoroethylene-hexafluoropropylene copolymer, a tetrafluoroethylene-perfluoroalkoxyethene copolymer, and a tetrafluoroethylene-ethylene copolymer. Others fibers are contemplated.

Particularly effective are polytetrafluoroethylene fibers. The makeup of the polytetrafluoroethylene may be one or more of PTFE (polytetrafluoroethylene), FEP (tetrafluoroethylene, hexafluoropropylene copolymer), PFA (tetrafluoroethylene, perfluoroalkoxy group copolymer), ETFE (tetrafluoroethylene, olefin copolymer), and the like. While PTFE (polytetrafluoroethylene) is preferred, other fibers will perform adequately. If polytetrafluoroethylene fibers are used, preferably PTFE is present in an amount from 90-100 parts by mass per 100 parts by mass of the polytetrafluoroethylene fibers.

In the case of a five sateen weave cloth component 30, it is preferred that the fluorine fibers be exposed on the surface 53 on the second side of the cloth component 30 over from 50-100% of the area of the surface 53.

The hardness of the outside surface 58 of the body 12 is preferably 85 degree or more, and preferably from 80-98 degree, as measured with a JIS A hardness meter.

With this hardness, even under heavy load, rubber compression can be suppressed, as can heat generation resulting from this condition. Abrasion and damage to the belt side surfaces 20, 22 can be avoided.

The load carrying members/cords 28 are preferably cords/ropes that exhibit a low degree of elongation and high strength. Suitable examples are twisted ropes made form organic fibers such as aramid fibers, polyamide fibers, polyethylene terephthalate fibers, and polyester fibers having ethylene-2,6-naphthalate as the main structural unit Inorganic fibers such as glass fibers may be used. Alternatively metal fibers may be used. Each load carrying member/cord 28 is adhered to the rubber in the body 12 after performing a resorcin-formalin-latex treatment. A rubber paste, or the like, may be applied to the surface following the resorcin-formalin-latex treatment.

Adhesion treatment is carried out by dipping the fibers in resorcin-formalin-latex (RFL) liquid. The dipped fibers are heated and dried after which an adhesive layer is uniformly applied on the surface thereof.

Other treatments may be used. For example, pre-treatment with an epoxy or isocyanate compound may be performed, after which an RFL liquid is applied.

The RFL liquid is obtained by mixing an initial condensate of resorcin and formalin with a latex. Examples of a suitable latex are: chloroprene, stylene-butadiene-vinylpyridine terpolymer, hydrogenated nitrile, and NBR. The hydrogenated nitrile is preferably made from the same rubber that is in the back portion 42, or the rubber in a cushion layer 60, in which the load carrying members/cords 28 are embedded.

The advantages of the present invention will be described with respect to specific examples, as set forth below.

Rubbers made with the formulation shown in Table 1, below, were kneaded by well known methods to prepare rubber sheets having a predetermined thickness produced by calendar rolls.

TABLE 1

| | Inventive Example | | | | | | | | Comparative Example | | | | | | |
|---|---|---|---|---|---|---|---|---|---|---|---|---|---|---|---|
| | A-1 | A-2 | A-3 | A-4 | A-5 | A-6 | A-7 | A-8 | A-9 | A-10 | A-11 | A-12 | A-13 | A-14 | A-15 |
| H-NBR containing unsaturated carboxylic acid*1) | 20 | 20 | 20 | 20 | 20 | 60 | 50 | 40 | 60 | 60 | 60 | — | 20 | 30 | 50 |
| H-NBR*2) | 80 | 80 | 80 | 80 | 80 | 40 | 50 | 60 | 40 | 40 | 40 | 100 | 80 | 70 | 50 |
| Stearic acid | 1 | 1 | 1 | 1 | 1 | 1 | 1 | 0.3 | 1 | 1 | 1 | 1 | 1 | 0.5 | — |
| Antioxidant | 2 | 2 | 2 | 2 | 2 | 2 | 2 | 2 | 2 | 2 | 2 | 2 | 2 | 1 | 1.5 |
| Carbon black | 40 | 40 | 40 | 40 | 40 | — | — | — | 40 | 40 | 50 | 40 | 40 | 40 | — |
| Plasticizer | 2 | 5 | 5 | 5 | 5 | 20 | 20 | 6 | 5 | 5 | 5 | 2 | 2 | 5 | 10 |
| Silica | 10 | 10 | 20 | 20 | 20 | 40 | 40 | 40 | 10 | 10 | — | 10 | 10 | — | — |
| Polyethylene glycol | 1 | 1 | 1 | 1 | 1 | 1 | 1 | — | 1 | 1 | — | 1 | 1 | — | — |
| Peroxide*3) | 2 | 2 | 2 | 2 | 2 | 2 | 2 | — | 2 | 2 | 2 | 2 | 2 | — | — |
| TAIC | 5 | 10 | 10 | 20 | — | 5 | 5 | 2 | — | 10 | 10 | 5 | — | — | — |
| TAC | — | — | — | — | 5 | — | — | — | — | — | — | — | — | — | — |
| N,N-m-phenylenedimaleimide | — | — | — | — | — | — | — | — | — | — | — | — | — | 5 | — |

The physical properties thereof were then measured. The results are shown in Table 2, below.

TABLE 2

| | Inventive Example | | | | | | | | Comparative Example | | | | |
|---|---|---|---|---|---|---|---|---|---|---|---|---|---|
| | A-1 | A-2 | A-3 | A-4 | A-5 | A-6 | A-7 | A-8 | A-9 | A-10 | A-11 | A-12 | A-13 |
| Viscosity (125° C.) | 48.1 | 44.6 | 57.9 | 45.3 | 48.3 | 61.6 | 60.3 | 57.7 | 49.8 | 40.2 | 44.1 | 39.7 | 65.1 |
| Hardness | 90 | 93 | 94 | 95 | 90 | 93 | 95 | 95 | 83 | 85 | 88 | 80 | 86 |
| M100 [MPa] | 22.6 | — | — | — | 22.4 | 16.1 | 14.1 | 12.5 | 12.1 | 12.9 | 17.9 | 20.1 | 13.5 |
| TB [MPa] | 23.3 | 21.5 | 21.1 | 20.5 | 23.5 | 27.7 | 25.1 | 26.2 | 15.8 | 15.6 | 24.1 | 26.3 | 23.0 |
| EB [%] | 104 | 96 | 93 | 88 | 105 | 251 | 223 | 257 | 268 | 253 | 158 | 290 | 230 |
| Adhesion to aramid core wire [N/25 mm] | 340 Rubber tearing | 330 Rubber tearing | 330 Rubber tearing | 330 Rubber tearing | 315 Rubber tearing | 380 Rubber tearing | 380 Rubber tearing | 370 Rubber tearing | 100 Interface peeling | 100 Interface peeling | 380 Rubber tearing | 330 Rubber tearing | |

The cloth component 30 was made with the fibers shown in Table 3, produced below.

TABLE 3

|  | B-1 | B-2 | B-3 | B-4 | B-5 |
|---|---|---|---|---|---|
| Cloth component warp yarn | Nylon 6,6 | ← | ← | ← | ← |
| Cloth component weft yarn | Nylon fiber + urethane elastic yarn | PTFE Fiber + urethane elastic yarn | PTFE fiber + urethane elastic yarn | PTFE fiber + urethane elastic yarn | Aramid fiber |
| Cloth component weave textile weave | 2/2 twilled weave | ← | 1/3 twilled weave | Double cloth | 2/2 twilled weave |
| Thickness of cloth component (mm) | 0.350 | ← | ← | ← | ← |

Treatments were carried out as shown in Table 4, below

TABLE 4

|  | C-1 | C-2 | C-3 |
|---|---|---|---|
| Resorcin | — | — | — |
| Formalin | — | — | — |
| Water | — | — | — |
| Latex | — | — | — |
| Fluon | — | — | — |
| Compounded rubber F-1 | 100 | — | 100 |
| Compounded rubber F-2 | — | 100 | — |
| MEK | 2000 | 1250 | 570 |
| PAPI-135 | 100 | — | — |
| Graphite AT-20 | — | 100 | — |

The rubber paste treatment of Table 4 starts with the rubber blend in Table 5, below.

TABLE 5

|  | F-1 | F-2 |
|---|---|---|
| H-NBR*1 | 100 | 100 |
| Zinc flower | 2 | 2 |
| Stearic acid | 0.5 | 0.5 |
| HAF carbon black | 40 | — |
| Graphite AT-20 | — | 40 |
| Plasticizer | 10 | 10 |
| Vulcanization accelerator | — | — |
| Organic peroxide | 2.0 | 2.0 |
| Sulfur | — | — |

The rubber blend of Table 5 is dissolved in methyl ethyl ketone, as in C-2 and C-3 in Table 4. A polyarylpolyisocyanate (trademark PAPI™) as an isocyanate compound is then added to the resulting mixture to prepare a treating liquid An antifriction material such as MBI, N-(1,3-dimethylbutyl)-N'-phenyl-p-phenylenediamine, fluorine resin powder or graphite is appropriately added to the treating liquid. The tooth cloth is dipped in the resulting treating liquid and dried.

In Inventive Example 11, a cloth component/canvas 30 was subjected to the treatment in Table 4. The canvas had warp yarns 40 made from nylon fibers, and weft yarns 38 made from polytetrafluoroethylene fibers, nylon fibers, and polyurethane elastic yarns. The weft yarns were made with a plurality of first weft yarns at the second side 34 that engage a pulley and a plurality of second weft yarns on the first side 32 applied to the belt body 12. The plurality of first weft yarns contained polytetrafluoroethylene fibers. The proportion of polytetrafluoroethylene fibers in the plurality of first weft yarns exposed at the surface 53 of the second side was 50% of the entire surface area. In this Example, the proportion of the polytetrafluoroethylene fibers exposed at the first side 32 of the canvas was 0%.

In Inventive Example 12, a cloth component/canvas 30 was subjected to the treatment shown in Table 4. The canvas had the same constitution as that in Inventive Example 11. A plurality of first weft yarns contained the polytetrafluoroethylene fibers. These fibers were exposed over 66.7% of the area of the surface 53 at the second side 34. The proportion of the polytetrafluoroethylene fibers exposed at the first side 32 was 0%.

In Inventive Example 13, a cloth component/canvas 30 was subjected to the treatment shown in Table 4 and had the same constitution as that for Inventive Example 11. The plurality of first weft yarns exposed at the second side 34 had polytetrafluoroethylene fibers. These fibers were exposed at the second side 34 over 75% of the surface area. The proportion of the polytetrafluoroethylene fibers exposed at the first side 32 was 0%.

In Inventive Example 14, a cloth component/canvas 30 was subjected to the treatment shown in Table 4. The canvas had the same constitution as that in Inventive Example 11. The plurality of first weft yarns exposed at the second side 34 had polytetrafluoroethylene fibers. The fibers were exposed at the second side 34 over 80% of the surface area. The proportion of polytetrafluoroethylene fibers exposed at the first side 32 was 0%.

With Comparative Example 11, a canvas was subjected to the treatment shown in Table 4, The canvas had warp yarns consisting of nylon fibers and weft yarns consisting of nylon fibers and polyurethane elastic yarns. No polytetrafluoroethylene fibers were used. The dynamic friction coefficient at the second side of the canvas was measured. The dynamic friction coefficient measurement method was carried out with a face pressure of 0.185 g/mm and a line speed of 500 mm/min. The test results are shown in Table 6.

TABLE 6

|  | Inventive Example 11 | Inventive Example 12 | Inventive Example 13 | Inventive Example 14 | Comparative Example 11 |
|---|---|---|---|---|---|
| Proportion of fluorine fiber appearing on tooth portion surface (%) (In surface area of tooth portion) | 50 | 66.7 | 75 | 80 | 0 |
| Proportion of fluorine fiber appearing at rubber side (%) (in surface area of tooth portion) | 0 | 0 | 0 | 0 | 0 |
| Adhesive force Ab (N/25 mm) | 135 | 135 | 135 | 135 | 135 |
| Dynamic friction coefficient | 0.20 | 0.21 | 0.18 | 0.18 | 0.24 |

As seen from Table 6, the dynamic friction coefficient of the Inventive Examples ranged from 0.18 to 0.21, compared to 0.24 for Comparative Example 11. The dynamic friction coefficient is adequately small even with the proportion of polytetrafluoroethylene on the second side as low as 50%.

The various cloth components were wound around a mold to begin preparation of a belt. The mold had 120 teeth of ZBS tooth form. A load carrying cord/member, as shown in Table 7, below, was used, having been subjected to adhesion treatment with a rubber paste obtained by dissolving RFL in a hydrogenated rubber in a solvent such as toluene.

TABLE 7

| | No. D-1 |
|---|---|
| Constitution | K-Glass 3/19 |
| Strength (N/number) | 1400 |
| Elongation (%) | 4.0 |

A pair of SZ twist components was wound spirally with a predetermined tension at a pitch shown in Table 8, below.

TABLE 8

| | No. E-1 |
|---|---|
| Pitch (mm/number) | 1.4 |

The rubber sheet of Table 1 was adhered to the load carrying cords/members to produce a preform that was introduced into a vulcanization receptacle, wherein teeth were formed using a conventional pressure forming system. Pressure vulcanization was carried out at 165° C. for 30 minutes. Each belt back surface was polished to a constant thickness, with the belt cut to a width of 30 mm. Adhesion between the cloth component and rubber in the teeth was performed as shown in Table 9, below.

The belts had a 30 mm width, with 120 teeth of ZBS form and a pitch of 9.525 mm. This configuration is normally identified as 120 ZBS30.

Figure 4:
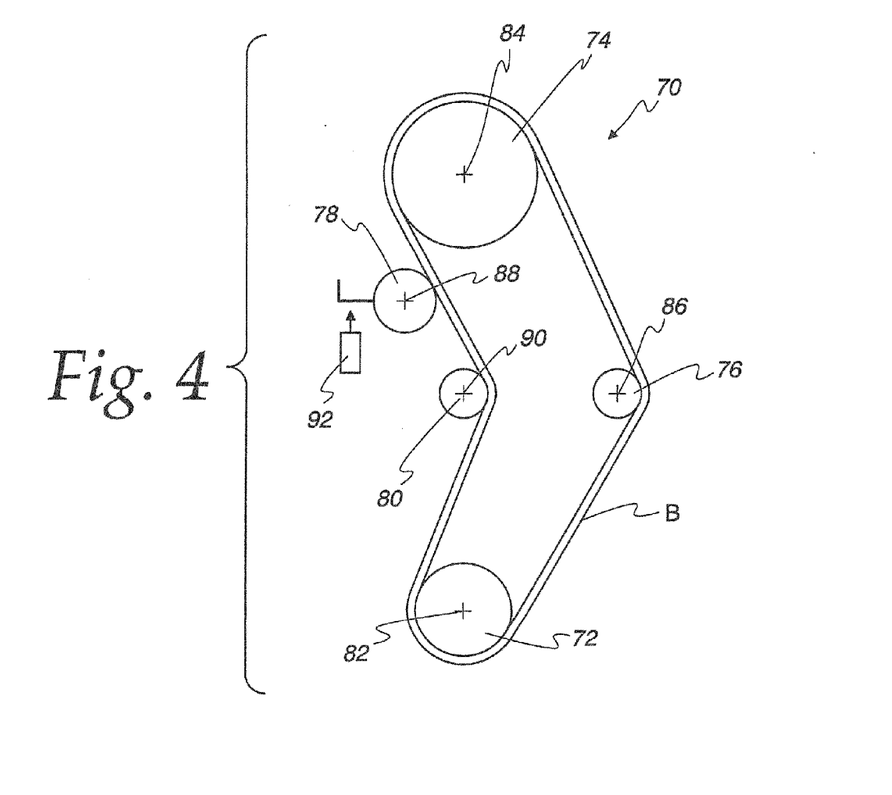
FIG. 4 is a schematic representation of a running test apparatus for toothed belts.

The testing apparatus for the belts, as shown at 70 in FIG. 4, was used. The apparatus 70 consists of a crank/drive pulley 72 (with 22 teeth), a cam pulley 74 (with 44 teeth), a water pump pulley 76 (with 19 teeth), an eccentric pulley 78, and an idler 80, each rotatable around spaced, parallel axes 82, 84, 86, 88, 90, consecutively. The eccentric pulley 78 was part of an autotensioner 92.

A tension of 3700 N was applied to the belts B with the crank/drive pulley 72 operated at 4,000 rpm The initial tension was 350N.

Thrust force and degree of damage on the edge faces were evaluated. The evaluation was conducted as follows. In the toothed portions at both edges of the belt B, the front surface of the toothed portions was marked out with a white ink. The test was conducted with the crank/drive pulley 72 rotated at 4,000 rpm for 200 hours. The residual thickness of the cloth component after running was evaluated. The relationship between the abrasion phenomenon and the residual thickness of the cloth component are shown in Table 10.

TABLE 10

| Grade | Residual mark | Edge face phenomenon |
|---|---|---|
| 1 | 100% | No damage |
| 2 | 60% | Damage: middle to small |
| 3 | 30% | Damage: large to middle |
| 4 | None | Large damage |

The results of the running test are shown in Table 11 below.

TABLE 11

| | Inventive Example | | | | | | | | Comparative Example | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Rubber | A-1 | A-2 | A-3 | A-4 | A-5 | A-6 | A-7 | A-8 | A-9 | A-10 | A-11 | A-12 | A-13 |
| Canvas | B-3 | B-4 | B-3 | ← | ← | ← | ← | ← | B-1 | ← | ← | ← | ← |
| Treatment | C-1 + C-2 | ← | ← | ← | ← | ← | ← | ← | ← | ← | ← | ← | ← |
| Degree of damage of edge face*1) | 1 | 1 | 1 | 1 | 1 | 1 | 1 | 1 | 2 | 2 | 2 | 4 | — |
| Thrust force (N) | 5 | 4 | 3 | 3 | 5 | 3 | 3 | 3 | 12 | 11 | 10 | 25 | — |

TABLE 9

| Item | Inventive Example 8 | Inventive Example 9 | Comparative Example 6 | Comparative Example 7 | Comparative Example 8 |
|---|---|---|---|---|---|
| Rubber | A-8 | ← | ← | ← | ← |
| Canvas | B-3 | B-4 | B-1 | B-2 | |
| Treatment | C-1 + C-2 | ← | C-1 + C-3 | ← | C-1 + C-2 |
| Adhesive force Ab (M/25 mm) | 270 | 275 | 300 | 40 | 35 |
| Dynamic friction coefficient | 0.15 | 0.15 | 1.5 | 1.0 | 0.6 |

As seen in Table 9, with Inventive Examples 8 and 9, the dynamic friction coefficient was decreased while maintaining good adhesion As seen in Table 10, Inventive Examples 8 and 9 had a small dynamic friction coefficient that effectively maintained the thickness of the cloth component As seen in Comparative Examples 7 and 8, the dynamic friction coefficient was relatively small, but due to relatively weak adhesion forces, breakage occurred at a relatively early stage.

As seen in Tables 2 and 11, because with Comparative Example 1 the amount of TAIC was as small as 2 parts by mass, insufficient hardness was obtained. As a result, slippage of the back face was reduced, with thrust forces increased.

With Comparative Examples 2 and 3, because silica was not added, good adhesion with the load carrying members/cords was not obtained. Interface peeling occurred.

With Comparative Example 4, because unsaturated carboxylic acid was not used, and H-NBR was used alone, the hardness did not increase and slippage was relatively low As a result, the degree of damage at the edge faces increased.

Comparative Example 5 uses N,N'-m-phenylenebismaleimide as the co-crosslinking agent. Because the viscosity of the rubber was too high in the uncrosslinked state, the tooth shape could not be accurately formed.

With Inventive Examples 1-5, by reason of the interaction due to the increased amount of TAIC or TAC and silica, hardness was increased, and the adherence to the load carrying member/cord was good. Peeling did not occur.

With Inventive Example 6, although within the range of the Inventive Examples, it is understood that where the amount of H-NBR containing the unsaturated carboxylic acid metal salt was too large, adhesion forces decreased, although the rubber had a high hardness.

Belts having the same size as Inventive Examples 1-8 were prepared using the rubber sheet, canvas, and treating liquid of the canvas shown in Table 12. They were made in the same way as Inventive Example 10, Comparative Example 9, and Comparative Example 10.

These belts were subjected to a biaxial high load test. The test conditions were as follows. The driving pulley had 33 teeth, with the driven pulley having 61 teeth. The driving pulley was driven at 1200 rpm with a load of 490 N·m with an initial belt tension of 550 N.

Inventive Example 10 had a life of 465 hours Comparative Examples 10 and 11 had lives of only 157 and 274 hours, which were shorter than that for Inventive Example 10.

Generally, the inventive belt 10 is particularly adaptable for high load applications. The belt 10 may be constructed to have good abrasion resistance and resistance to chipping. Tooth damage due to abrasion can be reduced by reason of decreasing the frictional coefficient of the cloth component 30. Dimensional accuracy of the belt shape can be achieved at manufacture and maintained, whereby consistent operation of associated equipment, such as an engine or power transmission system, can be achieved.

At the same time, good adhesion between the cloth component 30 and rubber in the body 12 may be established so that separation of the cloth component from the body 12 is avoided.

The formation of the cloth component may be such that the low coefficient fibers are not presented in an appreciable amount at the first side, as might lower adhesion between the cloth component 30 and body.

With the above advantages, long belt life may be anticipated.

The foregoing disclosure of specific embodiments is intended to be illustrative of the broad concepts comprehended by the invention.

The invention claimed is:

1. A power transmission belt comprising:
a body with a length, an inside, an outside, and laterally spaced and oppositely facing side surfaces,
the body having a plurality of teeth formed on one of the inside and outside of the body and spaced along the length of the body,
the body having a first surface at the one of the inside and outside of the body defined at least in part by the teeth; and
a cloth component having oppositely facing first and second sides with the first side attached to the first surface and the second side exposed to engage a pulley cooperating with the power transmission belt,
the cloth component comprising first fibers at the first side of the cloth component with a first performance characteristic and second fibers at the second side of the cloth component with a second performance characteristic that is different than the first performance characteristic,
wherein the cloth component comprises a double cloth construction defined by a first plurality of warp yarns interwoven with a first plurality of weft yarns,
yarns in each of the first plurality of warp yarns and first plurality of weft yarns each extending continuously between the first and second sides to be exposed to both of the first and second sides and form a single interwoven layer between the first and second sides over the entire length of the cloth component,
wherein: a) the first plurality of warp yarns comprises a second plurality of warp yarns with fibers exposed at one of the first and second sides and a third plurality of warp yarns with fibers exposed at the other of the first and second sides; and/or b) the first plurality of weft yarns comprises a second plurality of weft yarns with fibers exposed on the first side and a third plurality of weft yarns with fibers exposed at the second side,
the first side of the cloth component having different properties than the second side of the cloth component by reason of a presence of the first and second fibers.

2. The power transmission belt according to claim 1 wherein the body comprises rubber that defines at least a part of the first surface and at least one load carrying member is embedded in the rubber and extends lengthwise of the body adjacent the other of the inside and outside of the body.

3. The power transmission belt according to claim 1 wherein the body comprises rubber that defines at least a part of the first surface, the first fibers comprise a composition that adheres to the rubber at the first surface more strongly than a composition of the second fibers and the composition of the second fibers has a coefficient of friction that is lower than a coefficient of friction for the composition of the first fibers.

4. The power transmission belt according to claim 2 wherein the first fibers have a composition that adheres more strongly to the rubber than the composition of the second fibers and the second fibers have a composition with a lower coefficient of friction than a coefficient of friction of the first fibers.

5. The power transmission belt according to claim 3 wherein the second fibers have better abrasion resistance characteristics than the first fibers.

6. The power transmission belt according to claim 3 wherein the second fibers comprise fluorine fibers.

7. The power transmission belt according to claim 3 wherein the cloth component comprises warp yarns comprising nylon fibers and weft yarns comprising fluorine fibers, nylon fibers, and polyurethane elastic yarns.

8. The power transmission belt according to claim 6 wherein the cloth component comprises warp yarns comprising fluorine fibers, nylon fibers, and polyurethane elastic yarns and weft yarns comprising nylon fibers.

9. The power transmission belt according to claim 8 wherein the weft yarns comprise a plurality of first weft yarns at the first side of the cloth component and a plurality of second weft yarns at the second side of the cloth component and at least the plurality of second weft yarns comprises fluorine fibers.

10. The power transmission belt according to claim 8 wherein the warp yarns comprise a plurality of first warp yarns at the first side of the cloth component and a plurality of second warp yarns at the second side of the cloth component and at least the second warp yarns comprise fluorine fibers.

11. The power transmission belt according to claim 9 wherein from 20-100% of the warp yarns are woven by being intertwined with the second weft yarns.

12. The power transmission belt according to claim 10 wherein from 20-100% of the weft yarns are woven to by being intertwined with the second warp yarns.

13. The power transmission belt according to claim 11 wherein the second weft yarns comprise urethane elastic yarns that have core parts with exposed circumferences and fluorine fibers are applied on the exposed circumferences of the core parts.

14. The power transmission belt according to claim 12 wherein the second warp yarns comprise urethane elastic yarns that have core parts with exposed circumferences and fluorine fibers are applied on the exposed circumferences of the core parts.

15. The power transmission belt according to claim 11 wherein the first weft yarns comprise urethane elastic yarns that have core parts with exposed circumferences and nylon fibers are applied on the exposed circumferences of the core parts.

16. The power transmission belt according to claim 12 wherein the first warp yarns comprise urethane elastic yarns that have core parts with exposed circumferences and nylon fibers are applied on the circumferences of the core parts.

17. The power transmission belt according to claim 6 wherein the second side of the cloth component has an area and the fluorine fibers in the cloth component are exposed on the second side over from 30-100% of the area of the second side.

18. The power transmission belt according to claim 3 wherein the second fibers comprise fluorine fibers, and the first side of the cloth component comprises five sateen weaves, wherein the cloth component comprises warp yarns comprising nylon fibers and weft yarns comprising fluorine fibers, nylon fibers, and polyurethane elastic yarns.

19. The power transmission belt according to claim 7 wherein the fluorine fibers comprise at least one of a polytetrafluoroethylene, a polytrifluoroethylene, a tetrafluoroethylene-hexafluoropropylene copolymer, a tetrafluoroethylene-perfluoroalkoxyethylene copolymer, and a tetrafluoroethylene-ethylene copolymer.

20. The power transmission belt according to claim 8 wherein the fluorine fibers comprise at least one of a polytetrafluoroethylene, a polytrifluoroethylene, a tetrafluoroethylene-hexafluoropropylene copolymer, a tetrafluoroethylene-perfluoroalkoxyethylene copolymer, and a tetrafluoroethylene-ethylene copolymer.

21. The power transmission belt according to claim 18 wherein the fluorine fibers comprise at least one of a polytetrafluoroethylene, a polytrifluoroethylene, a tetrafluoroethylene-hexafluoropropylene copolymer, a tetrafluoroethylene-perfluoroalkoxyethylene copolymer, and a tetrafluoroethylene-ethylene copolymer.

22. The power transmission belt according to claim 7 wherein the fluorine fibers comprise polytetrafluoroethylene fibers and a polytetrafluoroethylene content in the polytetrafluoroethylene fibers is from 90-100 parts by mass per 100 parts by mass of the polytetrafluoroethylene fiber.

23. The power transmission belt according to claim 8 wherein the fluorine fibers comprise polytetrafluoroethylene fibers and a polytetrafluoroethylene content in the polytetrafluoroethylene fibers is from 90-100 parts by mass per 100 parts by mass of the polytetrafluoroethylene fiber.

24. The power transmission belt according to claim 18 wherein the fluorine fibers comprise polytetrafluoroethylene fibers and a polytetrafluoroethylene content in the polytetrafluoroethylene fibers is from 90-100 parts by mass per 100 parts by mass of the polytetrafluoroethylene fiber.

25. The power transmission belt according to claim 18 wherein the second side of the cloth layer has an area and the fluorine fibers on the cloth layer are exposed on the second side over from 50-100% of the area of the second side of the cloth layer.

26. The power transmission belt according to claim 19 wherein the second side of the cloth layer has an area and the fluorine fibers on the cloth layer are exposed on the second side over from 50-100% of the area of the second side of the cloth layer.

27. The power transmission belt according to claim 22 wherein the second side of the cloth layer has an area and the fluorine fibers on the cloth layer are exposed on the second side over from 50-100% of the area of the second side of the cloth layer.

28. The power transmission belt according to claim 1 wherein a resorcin-formalin-latex treatment is applied to the cloth component.

29. The power transmission belt according to claim 28 wherein the resorcin-formalin-latex comprises fluorine resin in an amount of 1-80 parts by mass per 100 parts by mass of the latex.

30. The power transmission belt according to claim 1 wherein the cloth component is treated with a rubber paste containing graphite in an amount of from 10-200 parts by mass per 100 parts by mass of the rubber.

31. The power transmission belt according to claim 3 wherein the rubber defines at least part of the teeth and is a composition obtained by blending an unsaturated carboxylic acid metal salt and silica with a hydrogenated nitrile rubber, blending short fibers to produce a mixture, and crosslinking the mixture with an organic peroxide.

32. The power transmission belt according to claim 3 wherein the rubber defines at least a part of the teeth and is a composition obtained by adding an unsaturated carboxylic acid metal salt to a hydrogenated nitrile rubber in an amount of from 15-40 parts by mass to a total polymer mass, blending silica in an amount of from 10-60 parts by mass to the total polymer mass, and blending short fibers in an amount of from 1-20 parts by mass to the total polymer mass.

33. The power transmission belt according to claim 31 wherein the blended amount of silica is from 30-60 parts by mass.

34. The power transmission belt according to claim 32 wherein the blended amount of silica is from 30-60 parts by mass.

35. The power transmission belt according to claim 31 wherein at least one of triallylisocyanurate, triallylcyanurate, trimethylolpropane trimethacrylate and ethylene glycol dimethacrylate is added to the rubber as a co-crosslinking agent in an amount of from 5 to 20 parts by mass, and an organic peroxide is added to the rubber in an amount of from 0.2 to 10 parts by mass.

36. The power transmission belt according to claim 32 wherein at least one triallylisocyanurate, triallylcyanurate, trimethylolpropane trimethacrylate and ethylene glycol dimethacrylate is added to the rubber as a co-crosslinking agent in an amount of from 5 to 20 parts by mass, and an organic peroxide is added to the rubber in an amount of from 0.2 to 10 parts by mass.

37. The power transmission belt according to claim 1 wherein the other of the inside and outside of the body has a hardness of from 80-98 degree as measured with JIS A type hardness meter.

38. The power transmission belt according to claim 1 wherein the first side of the cloth component has different properties than the second side of the cloth component by reason of different compositions of fibers at the first and second sides.

* * * * *